(12) United States Patent
Kon et al.

(10) Patent No.: US 9,292,172 B2
(45) Date of Patent: Mar. 22, 2016

(54) IMAGE EDITING METHOD, IMAGE EDITING DEVICE, AND COMPUTER READABLE MEDIUM FOR STORING IMAGE EDITING PROGRAM

(71) Applicant: Facebook, Inc., Menlo Park, CA (US)

(72) Inventors: Karin Kon, Kanagawa (JP); Kei Yamaji, Kanagawa (JP); Kazuhiro Mino, Kanagawa (JP)

(73) Assignee: Facebook, Inc., Menlo Park, CA (US)

( * ) Notice: Subject to any disclaimer, the term of this patent is extended or adjusted under 35 U.S.C. 154(b) by 323 days.

(21) Appl. No.: 13/950,206

(22) Filed: Jul. 24, 2013

(65) Prior Publication Data

US 2013/0311897 A1 Nov. 21, 2013

Related U.S. Application Data

(63) Continuation of application No. 12/569,947, filed on Sep. 30, 2009, now Pat. No. 8,499,242.

(30) Foreign Application Priority Data

Sep. 30, 2008 (JP) .................................. 2008-253712

(51) Int. Cl.
| | |
|---|---|
| G06F 3/00 | (2006.01) |
| G06F 3/0482 | (2013.01) |
| G06T 11/60 | (2006.01) |

(52) U.S. Cl.
CPC ............. *G06F 3/0482* (2013.01); *G06T 11/60* (2013.01)

(58) Field of Classification Search
CPC ...................................................... G06F 21/31

USPC ................. 715/733, 738, 741, 743, 751, 764; 382/115, 118, 305, 306; 707/784
See application file for complete search history.

(56) References Cited

U.S. PATENT DOCUMENTS

| | | | |
|---|---|---|---|
| 6,810,149 B1 | 10/2004 | Squilla et al. | |
| 7,587,068 B1 * | 9/2009 | Steinberg et al. ............. | 382/118 |
| 8,015,164 B2 | 9/2011 | Hamada | |
| 8,533,232 B1 * | 9/2013 | Hartman et al. ............... | 707/794 |
| 2002/0065848 A1 * | 5/2002 | Walker et al. .................. | 707/511 |
| 2003/0009527 A1 | 1/2003 | McIntyre et al. | |
| 2007/0094328 A1 * | 4/2007 | Birch ............................. | 709/204 |
| 2008/0253695 A1 | 10/2008 | Sano et al. | |
| 2008/0288499 A1 | 11/2008 | Choi et al. | |

FOREIGN PATENT DOCUMENTS

| | | |
|---|---|---|
| JP | 10232946 | 9/1998 |
| JP | 3196897 | 6/2001 |
| JP | 2006221494 | 8/2006 |

* cited by examiner

*Primary Examiner* — Haoshian Shih
(74) *Attorney, Agent, or Firm* — Sheppard Mullin Richter & Hampton LLP

(57) ABSTRACT

An image editing method comprises: a step of acquiring identification information on each of a plurality of operation instruction units for instructing editing of an image, a step of automatically selecting one or more images for editing from a group of images to classify the one or more images into a group of usable images based on the identification information, a step of determining a right to edit reaching contents of processing which each operation instruction unit is authorized to perform against each image in the group of usable images, and a step of performing editing processing on an image to be edited in the group of usable images based upon the determined right to edit according to an editing instruction supplied from each operation instruction unit.

19 Claims, 5 Drawing Sheets

SHOOTING TIME AXIS

OPERATOR A'S GROUP OF USABLE IMAGES

IMAGE EDITING METHOD, IMAGE EDITING DEVICE, AND COMPUTER READABLE MEDIUM FOR STORING IMAGE EDITING PROGRAM

CROSS-REFERENCE TO RELATED APPLICATIONS

The present application is a continuation application of and claims benefit to U.S. patent application Ser. No. 12/569,947, filed Sep. 30, 2009 and entitled "Image Editing Method, Image Editing Device, and Computer Readable Medium for Storing Image Editing Program," which claims priority to JP Application No. 2008-253712, filed Sep. 30, 2008 and entitled "Image Editing Method, Image Editing Device, and Computer Readable Medium for Storing Image Editing Program," which are hereby incorporated by reference herein.

The entire contents of the documents cited in this specification are incorporated herein by reference.

BACKGROUND

The present invention relates to an image editing device and method configured to edit and make browsable image data, and more specifically to an image editing device and method that enable a plurality of operators to edit image data simultaneously and to a computer readable medium storing a program for executing the image editing method.

In recent years, various image editing systems have been proposed whereby some image data are included in the same electric album, and edited and saved so that a plurality of operators can share and browse the data. With such a system, there has also been proposed a method for a plurality of operators to perform their own desired edits on an album, the same image data in the album, and the like.

JP 10-232946 A, for example, describes an image processing device and method, whereby images to be arranged in a template are placed in an image list window on the right-hand side of a screen for an operator to select images of the favor in order to edit the album. The operator selects an image of the favor from the image list window and drags and drops the image with a mouse into an image selection window displayed on the left-hand side of the screen to have the selected image positioned in a desired order on a desired page.

For example, JP 3196897 B discloses an image printing apparatus that enables a plurality of operators to edit a common image. This apparatus has a plurality of image editing means corresponding respectively to a plurality of display screens so that the plurality of operators can use different display screens and editing means to perform different editing operations on a photographic image.

JP 2006-221494 A describes an image editing system for arranging images such as photographs and digital images such as characters in a desired format. Operators are given different rights to access the arranged images so that they may lay out the images their own ways for a desirable appearance.

However, according to the method described in JP 10-232946 A, whereby an image is selected from among a group of images displayed in a single display screen and moved to the image selection window, if a plurality of operators should try to edit the same image simultaneously, instructions given by the operators for selecting an image and arranging the image in a template conflict with each other so that the operators cannot locate their selected image in a desired position. In addition, the movements of the image and mouse pointers on the screen become complicated so that the operators cannot recognize their own processing on the screen, making operations such as a drag-and-drop difficult and reducing the ease of operation.

For example, if the operators simultaneously give instructions, a plurality of mouse pointers are displayed on the screen, and a plurality of images are dragged and dropped at the same time, which makes the movements on the screen complicated and makes smooth operations impossible.

According to the apparatus described in JP 3196897 B, the number of screens provided must be increased accordingly as the operators increase. Further, if a plurality of operators should try to edit the same image by modifying the same part thereof, a particular figure is displayed automatically, and thus none of the operators can accomplish their intended editing in that part.

Although the image editing system described in JP 2006-221494 A may permit editing as desired by one of the operators by granting a right to access a single image data. This, however, requires manual allocation of rights to access for each image data and thus reduces operation performance.

Thus, conventionally, should a plurality of operators try to edit the same object simultaneously, a first operator trying to change the background color of an album, a second operator trying to enlarge an image about his/her own face or cut it out, a third operator trying to add comments to the image, a fourth operator trying to turn the image sepia, and so forth, then either these operations do not produce any intended changes or a plurality of editing instructions conflict with each other, making the movements on the screen complicated, and each operator cannot perform their individual editing operation on the same object at a time, which reduces operation performance for each operator.

SUMMARY OF THE INVENTION

It is therefore an object of the present invention to solve the above problems associated with prior art and provide an image editing method and device as well as a computer readable recording medium storing a program for executing the image editing method, whereby a plurality of operators can each perform their desired editing operations easily with an enhanced operation performance without having difficulties in operation and without conflicts of their editing processing on the screen among the operators when the plurality of operators edit the same image data simultaneously.

An image editing method according to the present invention comprises: a step of acquiring identification information on each of a plurality of operation instruction units for instructing editing of an image, a step of automatically selecting one or more images for editing from a group of images to classify the one or more images into a group of usable images based on the identification information, a step of determining a right to edit reaching contents of processing which each operation instruction unit is authorized to perform against each image in the group of usable images, and a step of performing editing processing on an image to be edited in the group of usable images based upon the determined right to edit according to an editing instruction supplied from each operation instruction unit.

An image editing device according to the present invention comprises: a plurality of operation instruction units for instructing editing of image data, the operation instruction units having their respective identification information, an operator recognition unit for acquiring identification information of each of the operation instruction units, an image selection unit for automatically selecting one or more images for editing from a group of images to classify the one or more images into a group of usable images based on the identification information, an editing authorization unit for determining a right to edit reaching contents of processing which each operation instruction unit is authorized to perform against each image in the group of usable images selected by the image selection unit, and an editing processor for performing editing processing on an image to be edited in the group of usable images based upon the determined right to edit determined by the editing authorization unit according to an editing instruction supplied from each of the operation instruction units.

A computer readable medium according to the present invention is one configured to store a program for executing on a computer, the program comprising: a step of acquiring identification information on each of a plurality of operation instruction units for instructing editing of an image, a step of automatically selecting one or more images for editing from a group of images to classify the one or more images into a group of usable images based on the identification information, a step of determining a right to edit reaching contents of processing which each operation instruction unit is authorized to perform against each image in the group of usable images, and a step of performing editing processing on an image to be edited in the group of usable images based upon the determined right to edit according to an editing instruction supplied from each operation instruction unit.

DETAILED DESCRIPTION OF THE INVENTION

The following describes in detail the preferred embodiments of the image editing device and the image editing method according to the present invention referring to the accompanying drawings.

Figure 1:
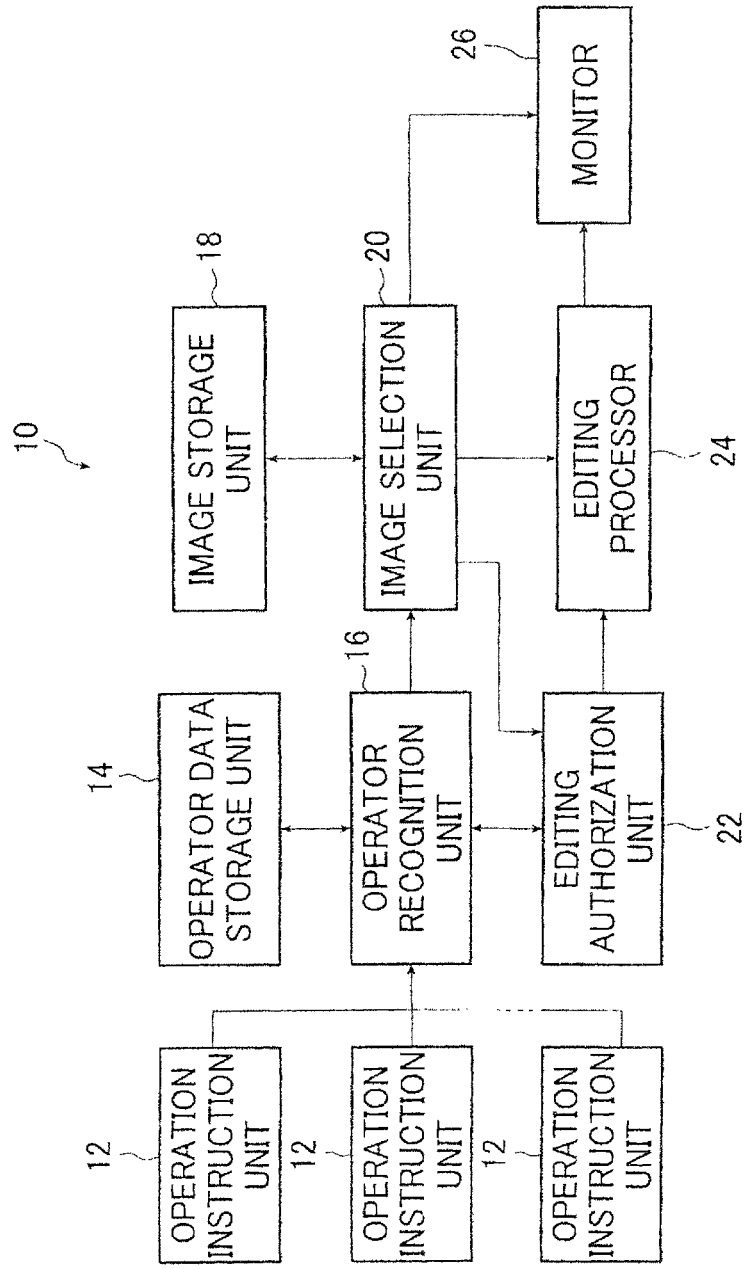
FIG. 1 is a block diagram illustrating a configuration of an image editing device according to an embodiment of the present invention.

FIG. 1 illustrates a configuration of an image editing device 10 according to an embodiment of the present invention.

The image editing device 10 comprises a plurality of operation instruction units 12, an operator data storage unit 14, an operator recognition unit 16, an image storage unit 18, an image selection unit 20, an editing authorization unit 22, an editing processor 24 and a monitor 26.

The operation instruction units 12 give instructions for arrangements of images in an album and image editing operations. Operators use their respective operation instruction units 12 to select images and locate them in positions in the album.

Each operation instruction unit 12 may be any known operation instruction means as exemplified by a remote controller using infrared communication, a mouse of a personal computer, a keyboard, a touch pen, and a touch panel.

The operation instruction units 12 contain their respective identification information unique thereto. The identification information may be identification data previously stored in the operation instruction units 12. An operator operates the corresponding operation instruction unit 12 to transmit instruction information for image editing and identification information associated therewith to the operator recognition unit 16 to request editing of the album. Specifically, an operator refers to an image displayed on the monitor 26, decides on the contents of editing to make in the image in the album, uses the operation instruction unit 12 to transmit identification information to the operator recognition unit 16 and gives an editing instruction.

The identification of an operator may be achieved by transmitting the identification information from the operation instruction unit 12 or, alternatively, each operator may have his/her operation movement previously stored as operation pattern in the operation instruction unit 12 or the operator recognition unit 16 so that reproduction of the operator's stored operation pattern movement may permit identification of the operator.

This makes it possible to determine which operator is giving which instruction, even when a plurality of operators give operation instructions about the same image data in the album. This will be described later in detail.

The operator data storage unit 14 is a data base storing information on the plurality of operators.

The operator data storage unit 14 has previously registered therein operator identification data and/or face images as recognition information for recognizing the operators. This information can be added and updated as necessary. The recognition information is used for the operator recognition unit 16 to determine the operator and for the image selection unit 20 and the editing authorization unit 22 described later to perform processing.

Figure 2:
FIG. 2 illustrates an example of recognition information used in the embodiment.

FIG. 2 illustrates an example of recognition information stored in the operator data storage unit 14.

In this embodiment, the recognition information uses an operator's identification data, face image data, preferred image keywords, etc. The recognition information is previously registered and stored in the operator data storage unit 14 separately for each operator.

The operator identification data is unique to each operator and is automatically set in the operator data storage unit 14 in association with the identification information supplied from the operation instruction unit 12.

An operator's face image is used for the image selection unit 20 to automatically select a group of images that can be arranged by that particular operator or for the editing authorization unit 22 to determine the right to edit for an image, contents of editing, and the like that each operator is authorized to perform. Image selection and determination of the right to edit will be described later in detail.

Two or more face images may be registered for each operator. In this case, the face images are prioritized. Examples of standards by which the images may be prioritized include images of the face directed frontward, images taken recently, images taken on a date closer to that of the image to be compared, images of a face size greater than a given threshold, and images of a quality better than a certain level. The priority may be set so that those images that enable comparison with greater accuracy are given higher priority.

The preferred image keywords related to an operator's preferred images are also registered. A registered keyword may be, for example, "flower" if the operator likes flowers or "car" if the operator likes cars. The registered keyword need not be the name of an object, but may be a color such as "red" or "blue," or a scenic backdrop such as "night scene."

The operator recognition unit 16 recognizes the operators operating their respective operation instruction units 12 according to the identification information for the operation instruction units 12 and the recognition information stored in the operator data storage unit 14.

Upon request for editing of the album by an operation instruction unit 12, the operator recognition unit 16 acquires recognition information corresponding to the identification information received from the operation instruction unit 12 from among the recognition information on the operators stored in the operator data storage unit 14.

Further, the operator recognition unit 16 transmits the acquired recognition information to the image selection unit 20.

Where the operation instruction units 12 are owned by operators unique thereto, the operator identification data as recognition information may be used as identification data unique to the individual operation instruction units 12 of their respective operators. However, the invention is not limited thereto. Operation instruction unit identification data unique to each operation instruction unit 12 and operator identification data of the operator who uses the operation instruction unit 12 may be stored in combination or in association with each other in the operator data storage unit 14 as identification information so that when the operator uses the operation instruction unit 12, the relevant operator identification data may be specified based upon the operation instruction unit identification data received from the operation instruction unit 12 and the operator recognition unit 16 may recognize the operator. Alternatively, the operator identification data may be entered directly or read by a bar code reader, for example, to recognize the operator. Further, the operator may be photographed with a camera or the like to enable recognition of the operator using the face image of the operator previously stored in the operator data storage unit 14.

The image storage unit 18 stores a group of images disposed on the album and available for editing and browse. The images stored in the image storage unit 18 each contain such photograph data as a shooting date and time.

The image selection unit 20 selects from the image storage unit 18 those images that operators can lay out for editing as usable images based upon the recognition information received from the operator recognition unit 16 and the photograph data on the images stored in the image storage unit 18.

The usable images are selected from the images stored in the image storage unit 18 in such a manner that all the images related to an operator of interest are selected. The related images herein are exemplified by images representing the operator, images related to the images representing the operator, and images meeting the operator's preference.

Selection of images representing the operator will be first described.

The image selection unit 20 subjects a group of images stored in the image storage unit 18 to face extraction processing, and judges the face-extracted images as images that include a person as the subject.

Then, the image selection unit 20 compares the face area of each of the images judged to include a person and the operator's face image contained in the recognition information received from the operator recognition unit 16. The comparison of face images may be performed by known face recognition processing. When the face in the face area of an image and the operator's stored face are of an identical person, the image is judged to represent the operator and selected to classify it into a group of usable images that may be used by the operator for arrangement thereof in the album.

Now, a description will be made of the selection of images related to the images representing the operator and images meeting the operator's preference.

The image selection unit 20 extracts the images related to the operator and the images meeting the operator's preference from among the images from which the face was not extracted in the image selection unit 20 according to the operator's preferred image keywords contained in the recognition information received from the operator recognition unit 16 and the photograph data on the images stored in the image storage unit 18 and selects these images to classify them into a group of usable images.

Image association will now be described in detail with reference to FIG. 3.

Figure 3:
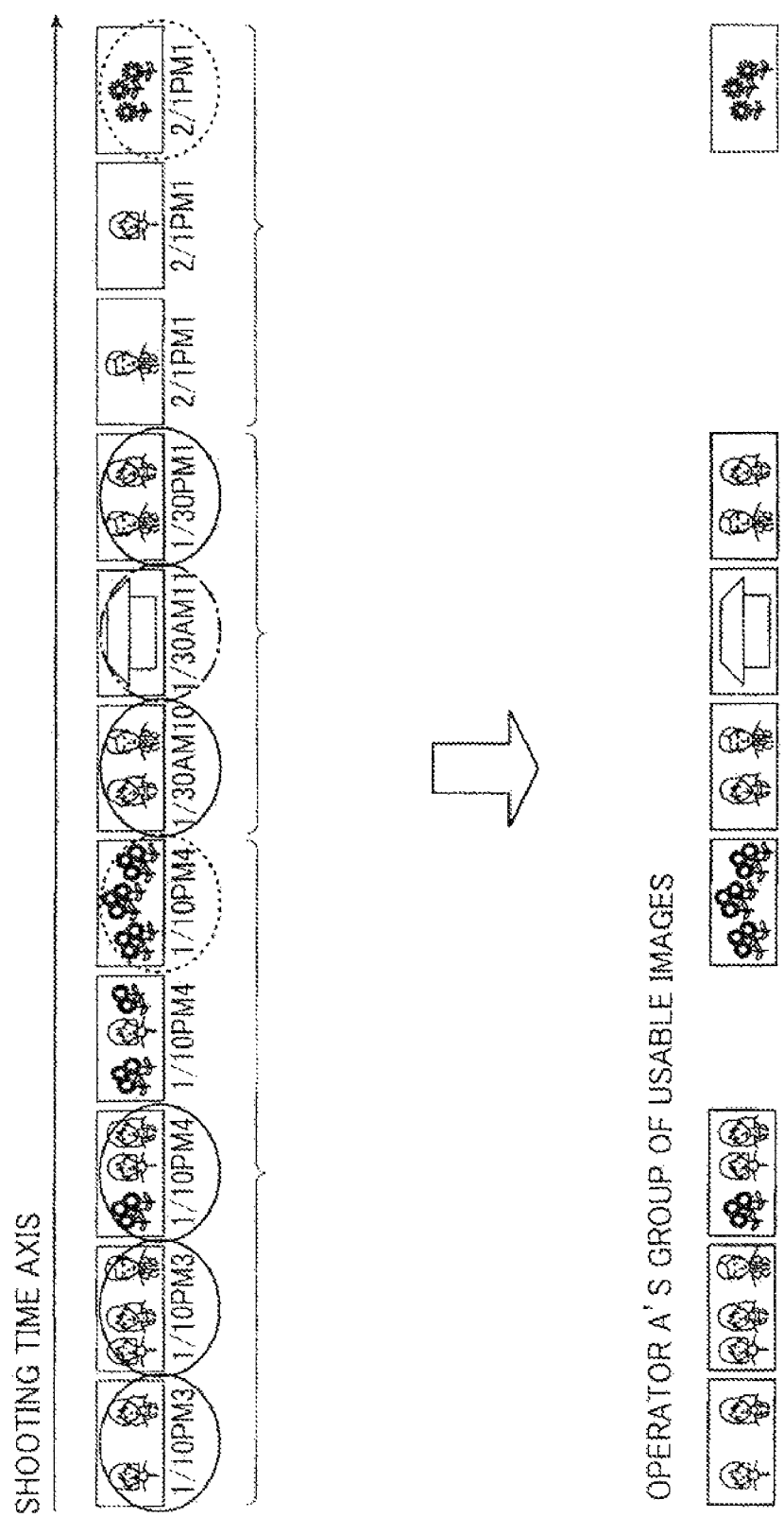
FIG. 3 schematically illustrates a method of selecting images for arrangement.

In FIG. 3, the images encircled by a solid line are usable images judged by the image selection unit 20 to include an image representing an operator A having the recognition information illustrated in FIG. 2, and thus all of the images include the face image of the operator A.

First, the images related to the operator A are extracted using the photograph data of the images. When the difference between the time at which an image that does not include a person was taken and the time at which any one of the selected usable images was taken is within a given range, the image that does not include a person is judged to be related to the operator A, and selected to be classified into a group of usable images. Given a time difference range of two hours, for example, the image encircled by an alternate long and short dashed line in FIG. 3 was taken within only an hour against the image on its left and, thus, is judged to be related to the operator A and selected to be classified into the operator A's group of usable images.

Next, the images meeting the operator A's preference are extracted using the operator A recognition information and the photograph data of the images stored in the image storage unit 18.

Now, suppose that the operator A recognition information is as illustrated in FIG. 2. The operator A's preferred image keywords are "plants" and "flowers".

Based upon these keywords, the image selection unit 20 extracts images including images representing flowers from the images that do not include a person, and selects these images to classify them into the operator A's group of usable images. In FIG. 3, the two images encircled by a dashed line represent flowers with including no person. These images, therefore, are selected to be classified into the operator A's group of usable images.

The preferred image keyword is not limited to the name of a subject, but may be a color, a figure, and the like. For example, when "pink" is registered as a keyword, an image with a large pink area may be extracted and selected to be classified into the operator A's group of usable images based upon the color information that results from image analysis.

Image extraction based upon preferred image keywords may be performed by analyzing images using a known method to specify images based upon the quantity of image characteristics, or by adding scene information or keywords to each image as tag information in advance at the time the image is taken and comparing those keywords with the preferred image keywords in the recognition information to extract usable images.

Thus, the image selection unit 20 extracts images including an image representing the operator A, images related to the operator A, and images meeting the operator A's preference, and automatically selects these images to classify them into the operator A's group of usable images.

The group of usable images may include an image shared by a plurality of operators. For example, an image including both the operator A and an operator B may be selected to be classified into both operator A's and operator B's groups of usable images, and arranged in the album.

The editing authorization unit 22 automatically specifies the operation instruction unit 12 (operator) having the right to edit the image data of an image of interest.

When a plurality of operators edit the same image, operators may give conflicting editing instructions or one operator's editing may not be in accordance with editing intended by another operator. Before operators start editing, therefore, the editing authorization unit 22 previously specifies an operator to be authorized to edit a particular image and grants him/her the right to edit in order to prevent conflict of editing instructions given by a plurality of operators. When the actual operator and the holder of the right to edit coincide, the operator can edit the image data of the image of interest.

The right to edit is automatically granted according to the results of automatic image data analysis, the contents of editing, attributes, and the like. When authorizing editing, one operation instruction unit 12 (operator) may be granted the right to edit the image data of one particular image or, alternatively, the operator to be granted the right to edit an image may be determined according to the contents of editing to be made or the part of the image to be edited. How the right to edit is granted will be described later in detail.

The editing processor 24 executes processing such as image editing based upon the right to edit granted by the editing authorization unit 22 to the operators (operation instruction units 12) according to the instructions respectively given by the operation instruction units 12.

The monitor 26 displays the images in the album. Further, the monitor 26 may display various other items in response to instructions by the editing processor 24 and other units.

One monitor 26 may be provided for one image editing device 10 or one monitor 26 may be provided for each operation instruction unit 12. Where a plurality of displays 26 are provided, they all display the same contents.

Figure 4:
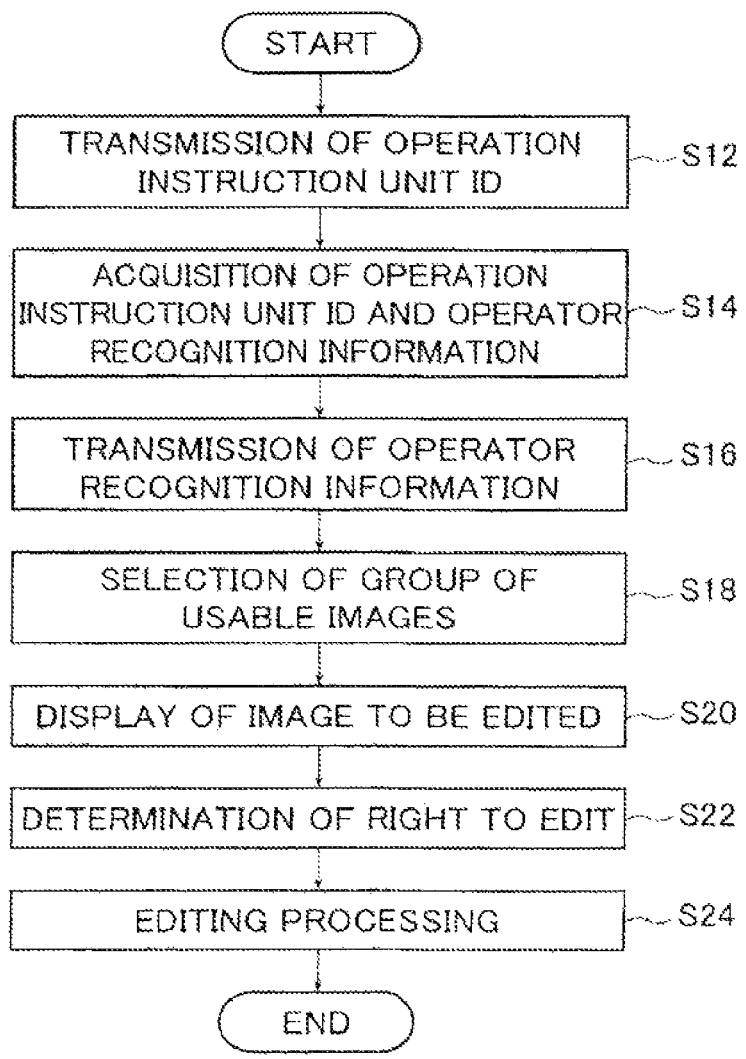
FIG. 4 is a flowchart illustrating an image editing method according to the embodiment.

Next, the image editing method according to this embodiment will be described referring to FIG. 4.

First, an operator operates the corresponding operation instruction unit 12 to transmit the operation instruction unit identification data of the operation instruction unit 12 to the operator recognition unit 16, requesting album editing to be started (Step S12).

The operator recognition unit 16 acquires information on displayed image editing instruction and operation instruction unit identification data, searches the operator data storage unit 14 using the acquired operation instruction unit identification data to acquire from the operator data storage unit 14 the operator recognition information containing the operator identification data, the face image, and the like associated with the identification information of the operation instruction unit 12, and recognizes the operator (step S14).

Then, the operator recognition unit 16 transmits the acquired operator recognition information to the image selection unit 20 and the editing authorization unit 22 (Step S16).

The image selection unit 20 then selects from the image storage unit 18 those images that can be displayed on the monitor 26 and edited by an operator to classify them into a group of the operator's usable images based upon the operator recognition information received from the operator recognition unit 16 and the photograph data on the images in the album stored in the image storage unit 18 and extracts the image data (Step S18).

The monitor 26 displays as images to be edited the reproduced images of the image data selected as usable images by the image selection unit 20 (Step S20).

The editing authorization unit 22 determines the right to edit for the operator at the corresponding operation instruction unit 12 reaching contents of processing based upon the operator recognition information received from the operator recognition unit 16 and the image analysis results, contents of editing, and attribute information, etc. of the image to be edited displayed on the monitor 26, and grants the operator the right to edit (step S22). How the right to edit is determined by the editing authorization unit 22 will be described later in detail.

Next, the editing processor 24 executes processing such as editing of images based upon the right to edit granted by the editing authorization unit 22 to the operator (operation instruction unit 12) according to the editing instructions by the operation instruction unit 12 (Step S24).

Thus ends the procedure of the image editing method.

The image editing method of the invention is likewise implemented where an image to be edited is displayed on the monitor 26.

In this case, an operator first observes an image displayed on the monitor 26, decides what editing to make on the displayed image, and operates the operation instruction unit 12 to transmit the displayed image editing instruction information and the operation instruction unit identification data, which are associated with each other, to the operator recognition unit 16, whereupon a request is made for editing the album stored in the image storage unit 18 (Step S12).

The operator recognition unit 16 acquires the displayed image editing instruction information and the operation instruction unit identification data, searches the operator data storage unit 14 using the acquired operation instruction unit identification data to acquire from the operator data storage unit 14 the operator recognition information containing the operator identification data, the face image, and the like associated with the operation instruction unit identification data, and recognizes the operator (step S14).

Then, the operator recognition unit 16 transmits the acquired operator recognition information and the editing instruction information for the image displayed on the monitor 26 to the editing authorization unit 22 (step S16). In the process, the operator recognition information need not be transmitted to the image selection unit 20 because the monitor 26 displays the image to be edited. Even when the operator recognition information is transmitted to the image selection unit 20, the image selection unit 20 need not select the image of interest as the usable image.

Next, the editing authorization unit 22 determines the right to edit for the operator at the corresponding operation instruction unit 12 reaching contents of processing based upon the operator recognition information received from the operator recognition unit 16 and the image analysis results, contents of editing, and attribute information, displayed image editing instruction information from the operator recognition unit 16, etc. and grant the operator the right to edit (step S22).

Next, the editing processor 24 executes processing such as image editing based upon the right to edit granted to the operator (operation instruction unit 12) according to the editing instructions from the operation instruction unit 12 (step S24).

As described above, the monitor 26 first displays an image selected by the image selection unit 20. Then, the editing authorization unit 22 determines the right to edit for operators based upon information on the operators received from the operator recognition unit 16 and the image analysis results, contents of editing, and attribute information, etc. of the displayed image, and grant the operators the right to edit (step S22).

Now, a detailed description will be made as to how the right to edit image data is determined by the editing authorization unit 22.

First, an example will be described of a method whereby the right to edit is determined based upon the results of automatic image data analysis by referring to FIGS. 5A to 5D and 6.

Figure 5D:
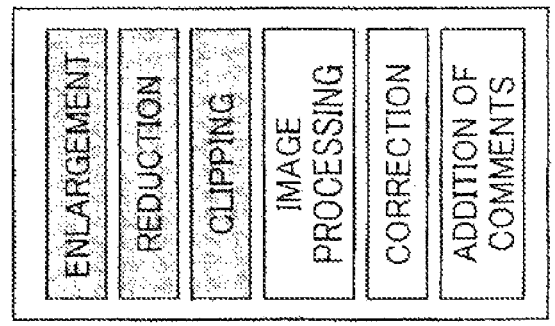
FIGS. 5B to 5D illustrate editing processings that operators are respectively authorized to perform according to the embodiment.
Figure 5C:
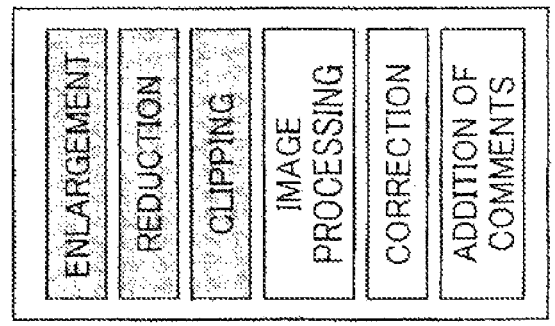
Figure 5B:
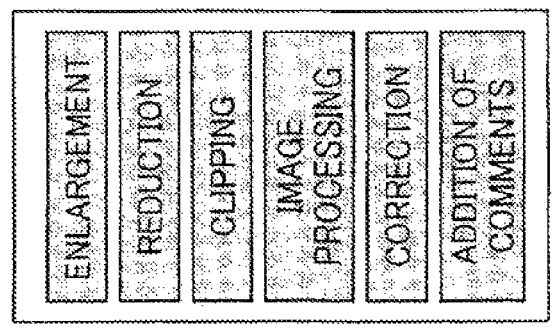
Figure 5A:
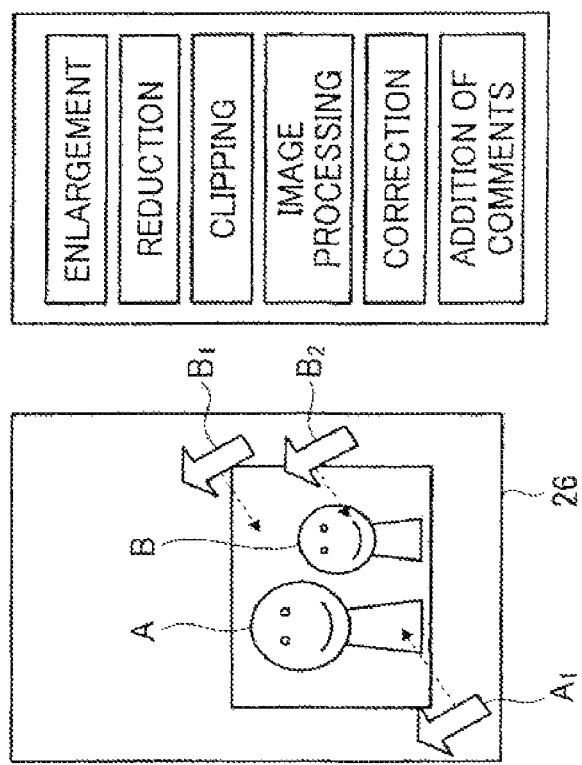
FIG. 5A illustrates an image to be edited.
Figure 6:
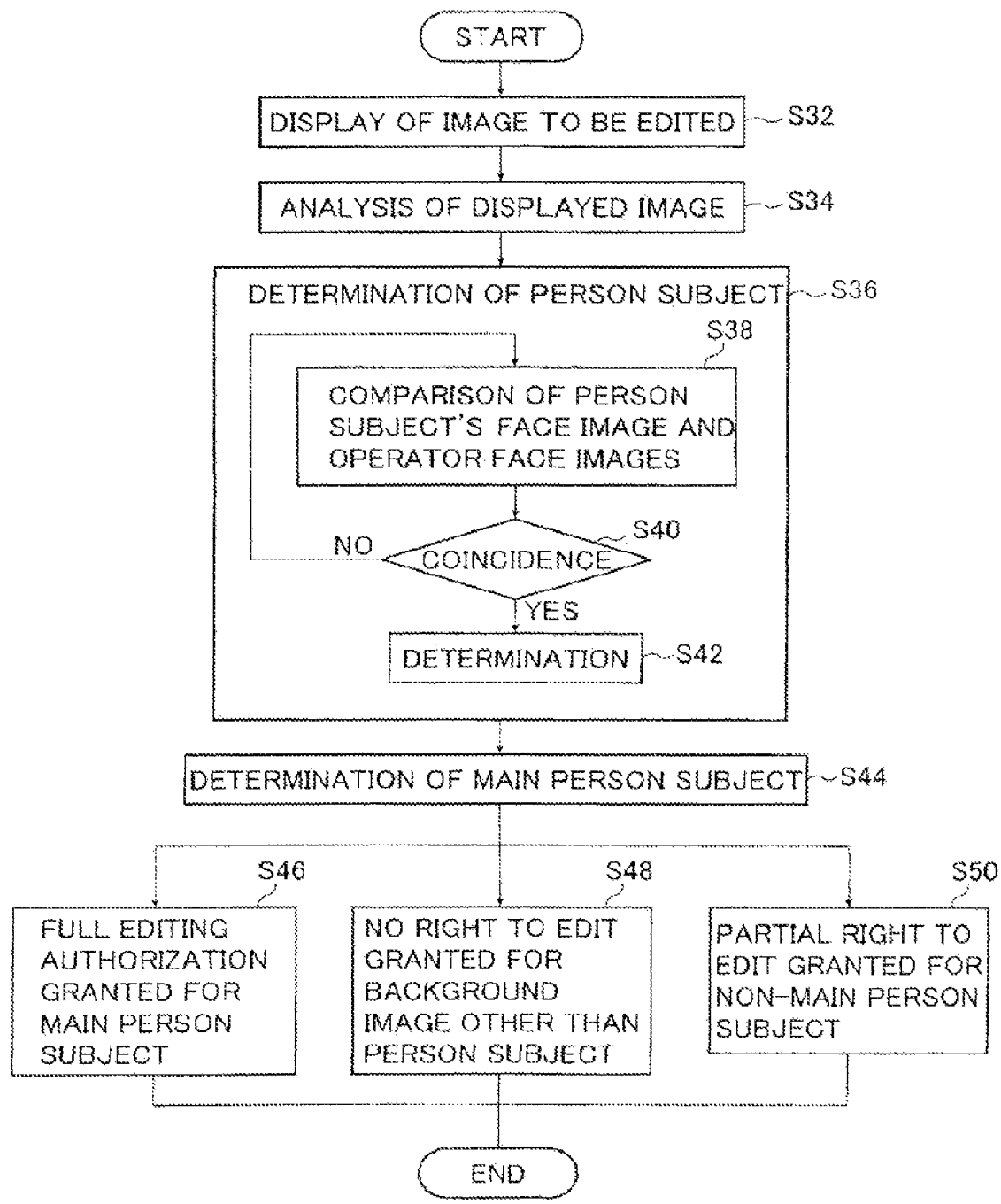
FIG. 6 is a flowchart illustrating how a right to edit is determined according to the embodiment.

FIG. 5A illustrates an image to be edited; FIGS. 5B to 5D illustrate editing processing that operators are authorized to perform under their respective conditions; FIG. 6 is a flow chart illustrating how the right to edit is determined.

As illustrated in 5A, an image is disposed from among, for example, the operator A's group of usable images as an image to be edited (step S32 in FIG. 6). This image includes the operator A and the operator B as subject of the photograph, with the operator A represented larger.

The editing authorization unit 22 analyzes the image (step S34), determines the person subjects (step S36), and determines the main subject, which occupies the largest area among the person subjects (step S44).

Determining the person subjects in the step S36 may be achieved using a method employed by the image selection unit 20. For example, the face image of each person subject in the displayed image obtained by face recognition processing is compared with the face images of the operators (step S38) and, when the former coincides with one of the face images of the operators (step S40), the person subject is then identified as that operator (step S42). Alternatively, information on the subject specified by the image selection unit 20 may be temporarily stored and used to identify the person subjects.

Identification of the person subjects in the step S36 in FIG. 6 is followed by automatic determination as to which subject is the main subject in the image of interest from the position and the size of the subjects in the step S44.

In FIG. 5A, both the operators A and B are subjects and because the operator A is represented larger, the operator A is determined as the main subject.

The editing authorization unit 22 grants the right to edit this image to the operator A, the main subject. The operator A is granted full right to edit this image. On the other hand, the operator B is not the main subject but a subject in the image. Accordingly, the editing authorization unit 22 allows the operator B to perform editing processing only on the area of the image representing the operator B.

FIGS. 5B to 5D illustrate specific editing items the operators are authorized to perform.

First, as illustrated in FIG. 5A, when the operator A locates a pointer A.sub.1 for the operation instruction unit 12 in the area of the image representing the operator A, the operator A, the main subject, is granted the right to perform all the editing items contained in the editing processing menu illustrated in FIG. 5B (step S40 in FIG. 6) and thus authorized to perform the whole editing processing menu.

On the other hand, when the operator B locates a pointer B.sub.1 in the background area of the image illustrated in FIG. 5A, the operator B is not granted the right to edit and thus not authorized to perform any of the editing items in the editing processing menu illustrated in FIG. 5C. Similarly, any operator other than the person subjects is also not granted the right to edit (step S48 in FIG. 6) and thus not authorized to perform any of the editing items in the editing processing menu.

When the operator B locates a pointer B.sub.2 in the area of the image representing the operator B, the operator B is granted the right to perform some of the editing items contained in the editing processing menu illustrated in FIG. 5D (step S50 in FIG. 6) and thus authorized to perform only some of the items in the editing processing menu.

As regards the unexecutable editing items, not only may the operations using the pointer be rendered impossible, a message or the like may be displayed to notify the operator that a particular item the operator attempted to perform is not executable.

Thus, the operator A, the main subject of the image illustrated in FIG. 5A, is authorized to freely perform editing processing in the whole area of this image. On the other hand, the operator B, who is a subject but not the main subject of this image, is authorized to perform editing processing only in the area of the image representing the operator B. Note that, in FIG. 5D, "enlargement," "reduction," and "clipping" processings are effected not on a partial area of the image but on the whole image. Since these processings would also affect the other areas than that representing the operator B, the operator B is not authorized to perform these processings.

There is no restriction to the editing items for which the right to edit is granted, and they may include image editing and corrections such as red-eye correction, black-and-white processing, sepia processing, and white balance setting, addition of comments to the image, image clipping and reduction, and the like. The editing items may also include such processing as clipping, enlargement, and reduction effected on specific subjects in the image.

When an image is placed in an album, selection of the background color may be included in the editing items. To print an image on a product such as T-shirt, a mug, etc., selection of the color for such a product may be included in the editing items.

Although, in the above example, the operator identified as the main subject in an image is granted full right to edit, the right to edit may be granted for a page of the album in lieu of for an image. For example, suppose that the main subject is determined for each of a plurality of images laid out in a given page of the album, the person represented by a subject who is the main subject in the most of the images in that page may be specified as the main subject of that page and granted full right to edit all the images within that page.

Next, an example will be described of a method whereby the right to edit is determined based upon the editing time spent for editing image data.

According to this method, the contents of editing performed and the time spent for editing by the operators thus far using the operation instruction units 12 are stored in the editing processor 24, for example. Then, the operator who spent the longest time in a particular editing or the operator who spent the longest time as a whole with all the editing items considered is granted a specific editing authority or full right to edit. Conversely, the operator who spent the shortest time in editing may be preferentially given the right to edit.

Further, an example will be described of a method whereby the right to edit is determined based upon the attribute information on image data.

According to this method, an operator who gave an instruction about an image is preferentially given the right to edit. Specifically, an operator who gave the first instruction about an image is granted full right to edit that image.

Conversely, the owner of an image, i.e., the operator who uploaded that image to the image editing device 10, may be granted full right to edit that image. Since the owner of an image may well be the main subject of that image, the operator granted the right to edit that image may well be the main subject of that image according to this method.

When a plurality of operators desire to edit the same image simultaneously, a single operator at a time may be given the right to edit for a given period of time or until a given quantity of editing processing has been performed, thereafter granting one operator after another the right to edit in sequence.

The right to edit granted by the above methods may be freely transferred to another operator or waived at the will of the operator having the right to edit. When the right to edit was waived, the editing authorization unit 22 automatically specifies an operator to be granted that right to edit from among the other operators than the one who waived the right.

When the operators are thus granted their respective rights to edit, they can edit the image within their rights to edit by referring to the image displayed on the monitor 26.

The right to edit may be determined by one of the methods as deemed optimum selected from the method based upon automatic image analysis, the method based upon the editing time, and the method based upon the attribute information on the image as described above. Alternatively, a judgment may be first made as to whether the owner of an image and the main subject thereof coincide based upon the image analysis results and the attribute information. When the owner and the main subject coincide, the corresponding operator is granted full right to edit. When the owner and the main subject of the image do not coincide, the person represented by the main subject may preferentially be granted full right to edit.

Thus, according to the image editing device of the invention, the operator who gives an image editing instruction is automatically recognized, and, furthermore, a judgment is made as to the relationship between the image to be edited and the operator using the image analysis results, the editing time, the attribute information and the like to automatically grant operator-specific rights to edit. Thus, even when a plurality of operators edit the same image data or the like simultaneously, the operators can perform their desired editing as they are preferentially authorized to edit an image representing them while striking a balance between the intentions of one operator who is a subject in the image and of another operator who is another subject in the image.

The above image editing method of the invention may be recorded in a computer-readable recording medium as a program for enabling a computer to execute required processing.

While the image editing method and device of the invention has been described above in detail, the present invention is not limited to the above embodiments and various modifications may be made without departing from the spirit and scope of the invention.

The invention claimed is:

1. A computer-implemented method comprising:
   selecting, by a computer system, an image from a set of images, wherein the image is editable by a first user and a second user;
   maintaining, by the computer system, attribute information about the first user and the second user;
   providing, by the computer system, based on the attribute information, a first permission to allow the first user to edit a first content area of the image and a second permission to allow the second user to edit a second content area of the image; and
   identifying a second image to be editable by the first user based on a time associated with the image and a time associated with the second image falling within a difference range.

2. The computer-implemented method of claim 1, wherein the attribute information includes a registered face image associated with the first user.

3. The computer-implemented method of claim 2, further comprising:
   extracting a face from the image; and
   identifying an individual in the image based on the extracted face.

4. The computer-implemented method of claim 3, further comprising comparing the registered face image and the extracted face to determine whether the first user and the individual are an identical person.

5. The computer-implemented method of claim 4, wherein the providing, based on the attribute information, the first permission to allow the first user to edit the first content area of the image is based on a determination that the first user and the individual are the identical person.

6. The computer-implemented method of claim 4, wherein the comparing the registered face image and the extracted face includes applying face recognition processing.

7. The computer-implemented method of claim 1, wherein the attribute information includes a key word selected by the first user.

8. The computer-implemented method of claim 7, wherein the providing, based on the attribute information, the first permission to allow the first user to edit the first content area of the image is based on a determination that the image includes a depiction of the key word.

9. The computer-implemented method of claim 1, wherein the providing, by the computer system, based on the attribute information, the first permission to allow the first user to edit the first content area of the image is based on a determination that the first user is a main subject of the image.

10. The computer-implemented method of claim 1, further comprising prohibiting the second user from applying editing processes to the second content area when the editing processes affect the first content area.

11. The computer-implemented method of claim 10, wherein the editing processes include at least one of enlargement, reduction, or clipping.

12. The computer-implemented method of claim 1, wherein the first content area is all of the image.

13. The computer-implemented method of claim 1, wherein the second content area is a portion of the image.

14. The computer-implemented method of claim 1, further comprising transferring the first permission to allow the first user to edit the first content area to another user.

15. The computer-implemented method of claim 1, wherein the attribute information includes ownership of the image.

16. The computer-implemented method of claim 1, further comprising allowing simultaneous editing of the image by the first user and the second user.

17. The computer-implemented method of claim 1, further comprising requiring sequential editing of the image by the first user and the second user.

18. A computer system comprising:
   at least one processor; and
   a memory storing instructions configured to instruct the at least one processor to perform:
      selecting an image from a set of images, wherein the image is editable by a first user and a second user;

maintaining attribute information about the first user and the second user; and providing based on the attribute information, a first permission to allow the first user to edit a first content area of the image and a second permission to allow the second user to edit a second content area of the image; and identifying a second image to be editable by the first user based on a time associated with the image and a time associated with the second image falling within a difference range.

19. A non-transitory computer-storage medium storing computer-executable instructions that, when executed, cause a computer system to perform a computer-implemented method comprising:

selecting an image from a set of images, wherein the image is editable by a first user and a second user;

maintaining attribute information about the first user and the second user;

providing based on the attribute information, a first permission to allow the first user to edit a first content area of the image and a second permission to allow the second user to edit a second content area of the image; and identifying a second image to be editable by the first user based on a time associated with the image and a time associated with the second image falling within a difference range.

* * * * *